(12) United States Patent
Matsumoto et al.

(10) Patent No.: US 8,640,151 B2
(45) Date of Patent: Jan. 28, 2014

(54) OPTICAL DISK APPARATUS

(75) Inventors: Koji Matsumoto, Kuala Lumpur (MY); Seiji Hamaie, Kawasaki (JP); Hideyuki Nagamine, Urayasu (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/479,469

(22) Filed: May 24, 2012

(65) Prior Publication Data

US 2012/0311615 A1 Dec. 6, 2012

(30) Foreign Application Priority Data

Jun. 3, 2011 (JP) ................................ 2011-125846

(51) Int. Cl.
*G11B 17/04* (2006.01)
*G11B 17/053* (2006.01)

(52) U.S. Cl.
USPC ............................ 720/611; 720/613; 720/651

(58) Field of Classification Search
USPC .......................... 720/601, 610, 611, 613, 651
See application file for complete search history.

(56) References Cited

U.S. PATENT DOCUMENTS

| | | | | |
|---|---|---|---|---|
| 7,020,884 B2 * | 3/2006 | Choi et al. | | 720/613 |
| 7,143,423 B2 * | 11/2006 | Arase | | 720/613 |
| 7,627,874 B2 * | 12/2009 | Kobayashi et al. | | 720/607 |
| 8,312,481 B2 * | 11/2012 | Chang | | 720/611 |
| 2003/0117928 A1 * | 6/2003 | Choi et al. | | 369/75.2 |
| 2006/0026611 A1 * | 2/2006 | Lee et al. | | 720/651 |
| 2012/0174135 A1 * | 7/2012 | Roh et al. | | 720/611 |

FOREIGN PATENT DOCUMENTS

| | | | |
|---|---|---|---|
| JP | 2007-149279 | | 6/2007 |
| JP | 2007-226961 | | 9/2007 |
| JP | 2008-117432 | | 5/2008 |
| JP | 2011-18416 | | 1/2011 |
| KR | 2001068973 A | * | 7/2001 |

* cited by examiner

*Primary Examiner* — Will J Klimowicz

(74) *Attorney, Agent, or Firm* — Antonelli, Terry, Stout & Kraus, LLP.

(57) ABSTRACT

An optical disk apparatus includes a tray mounting an optical disk and a casing which stores the tray so that the tray may be inserted into and ejected from the casing. The tray has a guide rail on at least one of parallel sides relative to the direction of tray insertion or ejection and for guiding the movement of tray in the direction of tray insertion or ejection. The casing has rail guides formed on a side section of the casing in opposition with the guide rails when the tray is inserted and for guiding the guide rail, and a spring member formed on a frontend of the rail guides in the direction of tray insertion or ejection to provide elastic deformation when a force toward the tray insertion direction is applied to the spring member.

4 Claims, 9 Drawing Sheets

OPTICAL DISK APPARATUS

INCORPORATION BY REFERENCE

The present application claims priority from Japanese application JP2011-125846 filed on Jun. 3, 2011, the content of which is hereby incorporated by reference into this application.

BACKGROUND OF THE INVENTION

The present invention relates to an optical disk apparatus which suppresses an external shock.

In recent years, light weighting and thinning in optical disk apparatus have been developed. Particularly, in a thinned optical disk apparatus typically of 12.7 mm or 9.5 mm in thickness and mountable on a note-sized personal computer, external shock may easily cause vibrations to an internal device on which an optical pickup is mounted, so that there is a fear of adversely affecting the performance of the apparatus.

To solve the problem, for example, there is proposed an optical disk apparatus in which convex rails are aligned laterally on inner surfaces of both right and left sides of a loader chassis at top of which a clamper is provided, concave grooves formed in both surfaces of right and left sides of a tray (drawer) on which the optical disk is mounted are slidably engaged with the convex rails whereby the tray is fit inside of the loader chassis so shat the tray can be inserted into or ejected from the apparatus, and an energizing means for energizing the tray toward the opposite side wall is integrally formed in the inner surface of a side wall of loader chassis to thereby suppress pitching and rolling of the apparatus upon insertion or ejecting of the tray. Refer to, for example, JP-A-2011-18416.

There is proposed an optical disk apparatus in which when a tray or drawer is at a storage position, a depression spring provided on a side surface of a chassis depresses the tray in a horizontal direction to thereby suppress the vibration of the tray. Refer to, for example, JP-A-2008-117432.

Referring to, for example, JP-A-2007-226961 there is proposed an optical disk apparatus in which a side pressure projection part is provided at a rear end of a guide rail, and a side pressure reception part is provided in a rear end corner of a tray (drawer), and when the tray is inserted into a casing of a drive, the side pressure projection part depresses the side pressure reception part to thereby lock the drawer.

Referring to, for example, JP-A-2007-149279 there is proposed an optical disk apparatus comprising a tray and a frame which can reciprocally guide the tray between a disk load and unload position and a disk reproduction position, in which the frame includes an anti-vibration means which engages with the tray loaded at the disk reproduction position to suppress vibrations of the tray.

SUMMARY OF THE INVENTION

However, the optical disk apparatus described in JP-A-2011-18416 is to suppress pitching and rolling of the apparatus caused when the tray is inserted or ejected, but no consideration is paid to a structure for suppressing a shock imposed upon recording or reproducing information using the optical disk apparatus.

In the optical disk apparatus described in JP-A-2008-117432 and JP-A-2007-226961, the tray is depressed in a direction perpendicular to an insert/eject direction of the tray to thereby suppress vibrations of the tray, so that when the tray is inserted or ejected, a depressing force is applied in a direction perpendicular to the tray transport direction. As a result, there is a fear of causing a failure to insertion and ejection of the tray.

In the optical disk apparatus disclosed in JP-A-2007-149279, a pair of ribs provided in a rear wall section of the frame sandwich a rear end edge of the tray or a resilient member is provided at the rear end edge of the tray and is depressed by an engaging rib provided at the rear wall section of the frame to thereby lock the tray to suppress vibrations of the tray. Thus, not only the structure is so much complicated, but also when the tray is ejected a force for sandwiching or depressing the tray is applied to the apparatus, so that there is a fear of failing to eject the tray.

In view of the above-mentioned problems the present invention has been made. The object of the present invention is to provide an optical disk apparatus which is free from failure to insertion and ejection of a tray, is capable of absorbing any external shock to reduce vibrations of the tray even though the external shock is applied to the apparatus in recording or reproducing information, and is highly reliable.

To achieve the object the present invention provides an optical disk apparatus for performing at least one of recording and reproduction of information on an information recording surface of a loaded optical disk, which comprises a tray mounting the optical disk, and a casing storing or loading the tray so that the tray may be inserted and ejected, the tray including guide rails which guide movement of the tray in directions of insertion and ejection of the tray on side walls of the tray parallel to the tray insertion and ejection directions, the casing including rail guides formed on sides thereof which oppose to the guide rails of the tray when inserted and for guiding the guide rails of the tray, and a spring member formed against an front end of at least one of the guide rails in the direction of tray insertion, and the spring member providing elastic deformation when a force in the direction of tray insertion is applied to the casing.

According to the present invention, there is provided an optical disk apparatus which is free from any failure to insertion and ejection of a tray, is capable of absorbing any external shock or collision to reduce vibrations of the tray even though the external shock is applied to the apparatus in recording or reproduction of information, and is highly reliable.

DETAILED DESCRIPTION OF THE EMBODIMENTS

In the following, description will be made of embodiments of the present invention with reference to the accompanying drawings. The following embodiments are exemplifications for explaining the invention, and the present invention is not intended to be limited to only these embodiments. Therefore, the present invention may be carried out in various aspects without departing from the spirits and gist of the invention.

Figure 1:
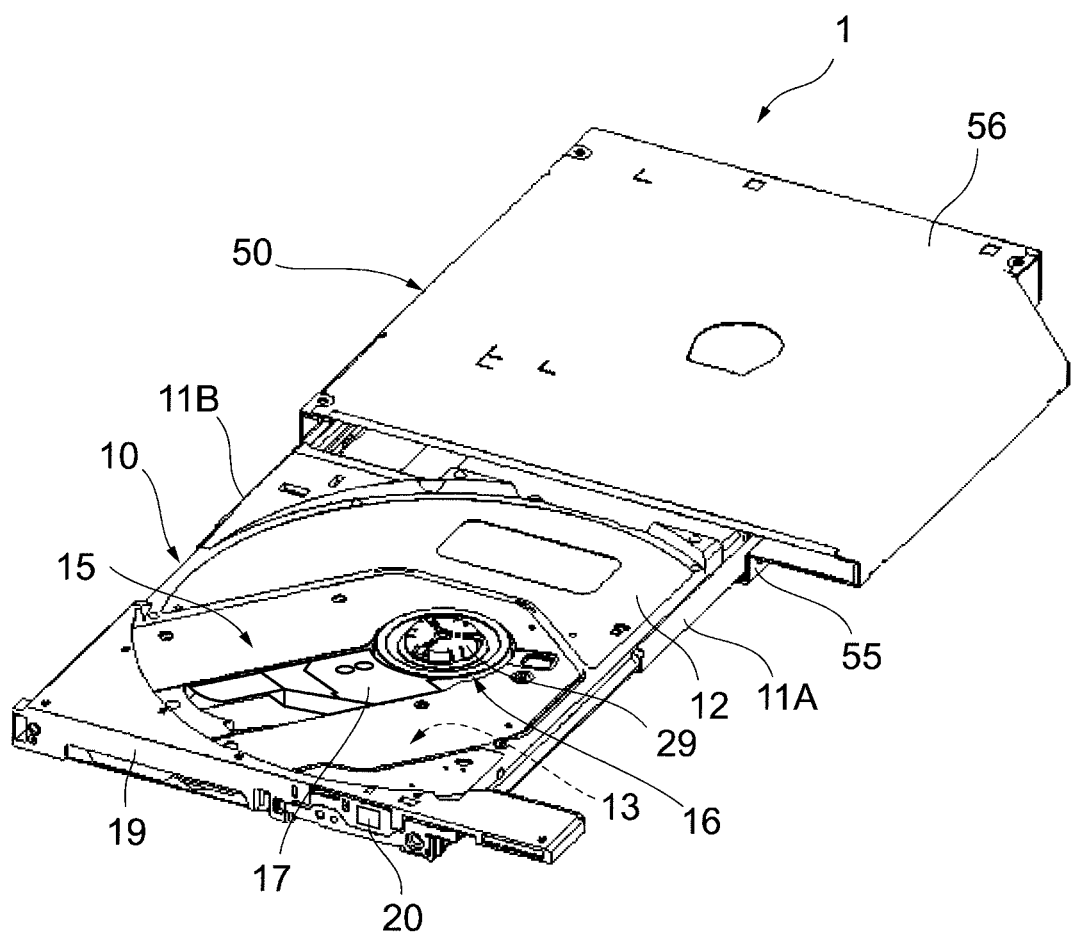
FIG. 1 is an oblique view of an optical disk apparatus according to an embodiment of the present invention, which shows the state of the apparatus where an overall tray is ejected from the casing.
Figure 2:
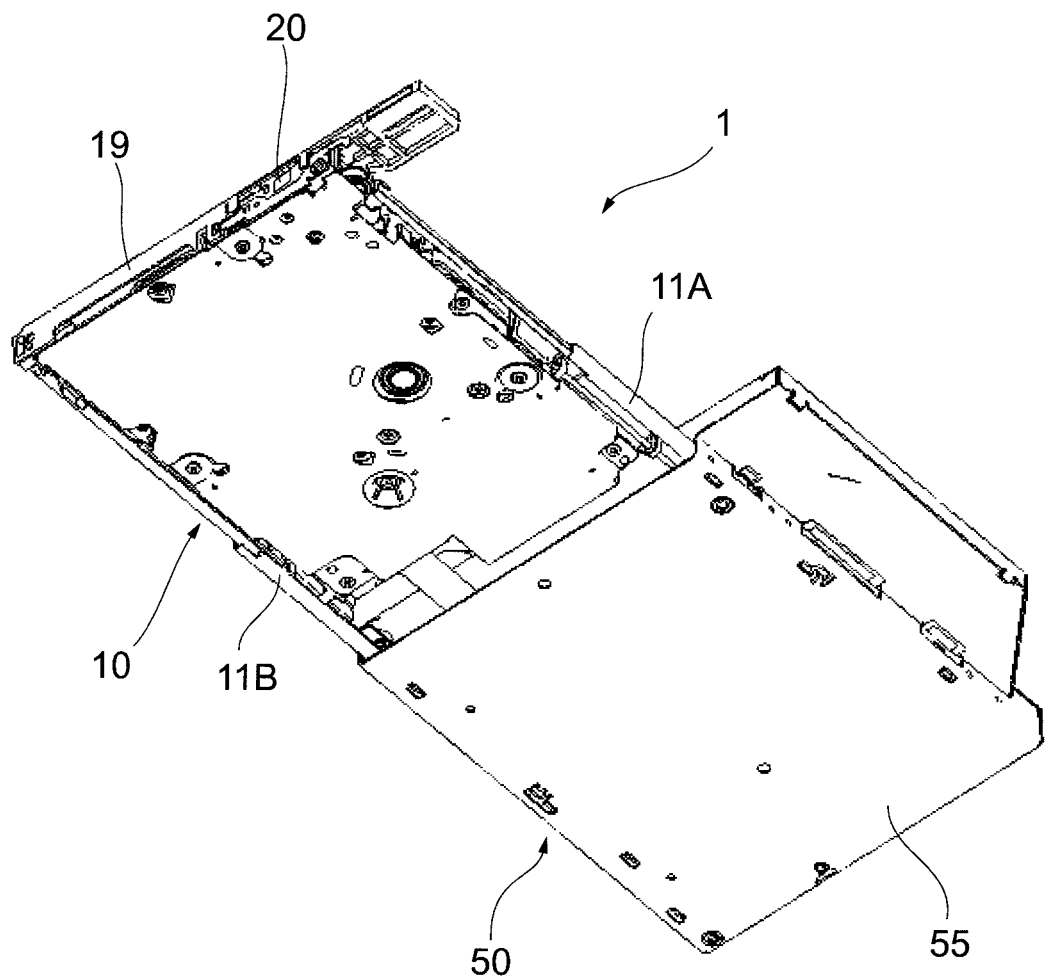
FIG. 2 is an oblique view of the optical disk apparatus shown in FIG. 1 when viewed from the rear surface thereof.
Figure 3:
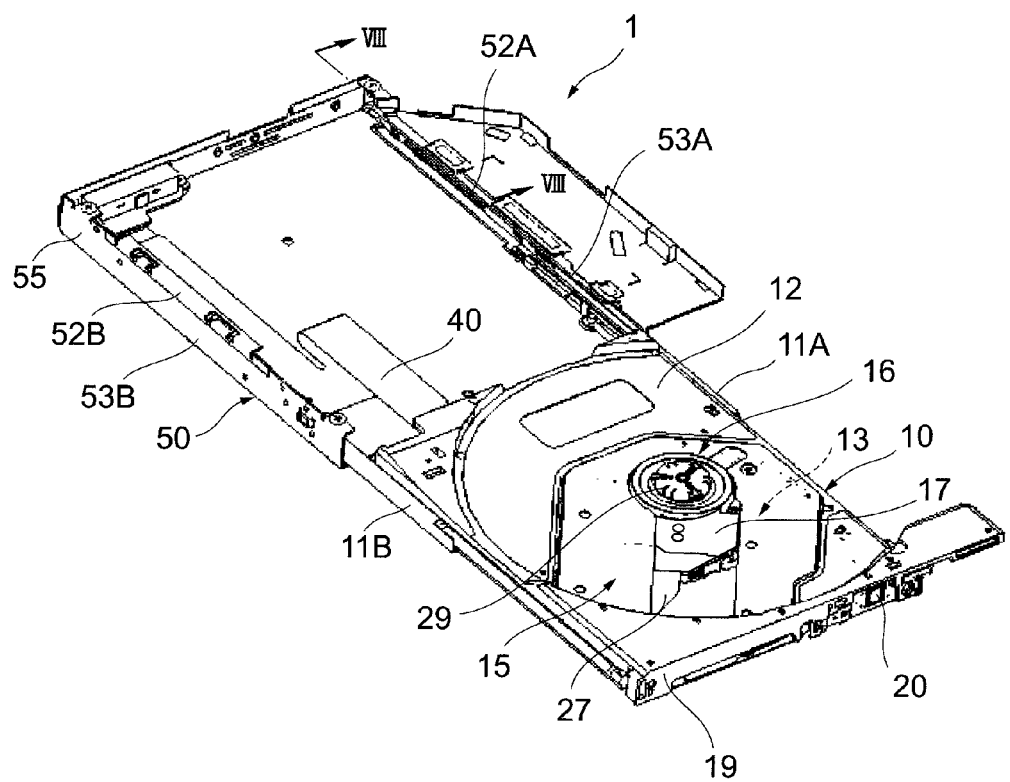
FIG. 3 is an oblique view of the optical disk apparatus shown in FIG. 1 showing the state of the apparatus when an upper cover is detached.
Figure 4:
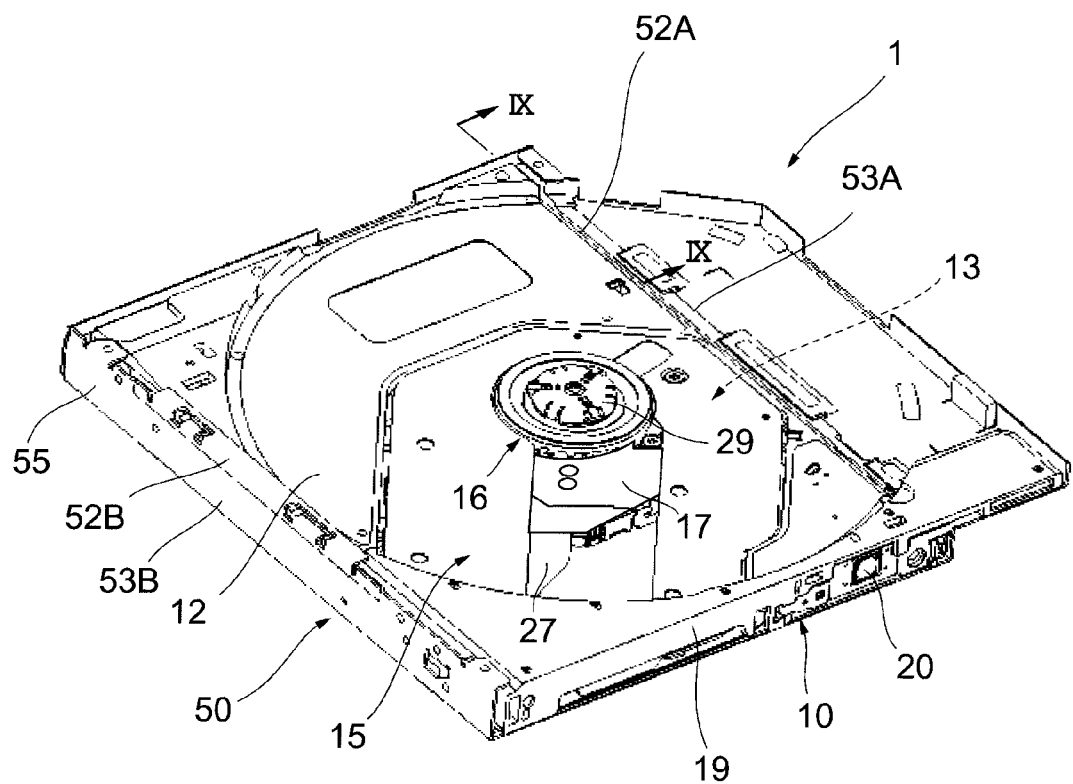
FIG. 4 is an oblique view of an optical disk apparatus according to an embodiment of the present invention, showing the state of the apparatus when an upper cover is detached, where a tray is stored in a casing.
Figure 5:
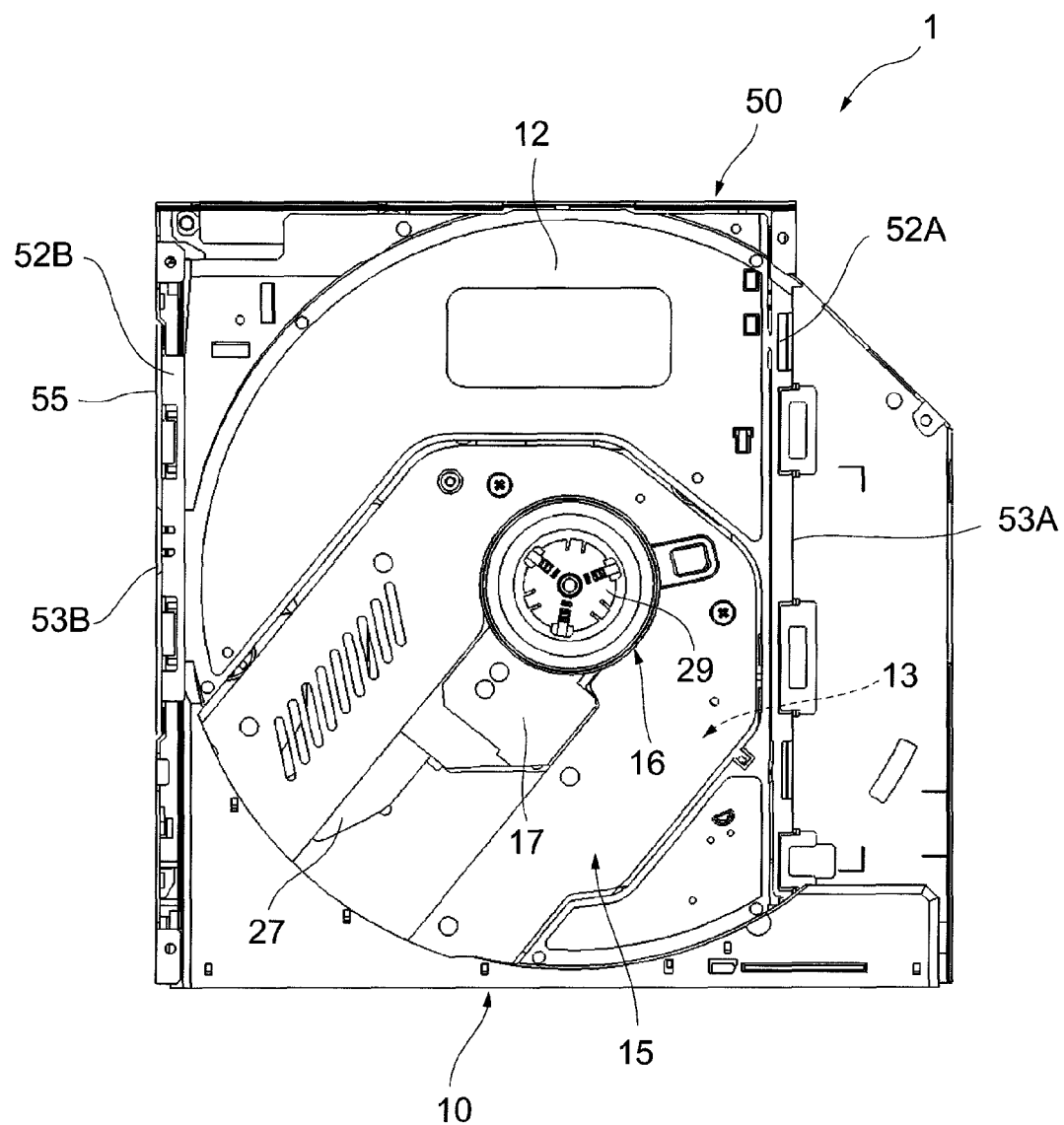
FIG. 5 is a plan view of the optical disk apparatus shown in FIG. 4.
Figure 6:
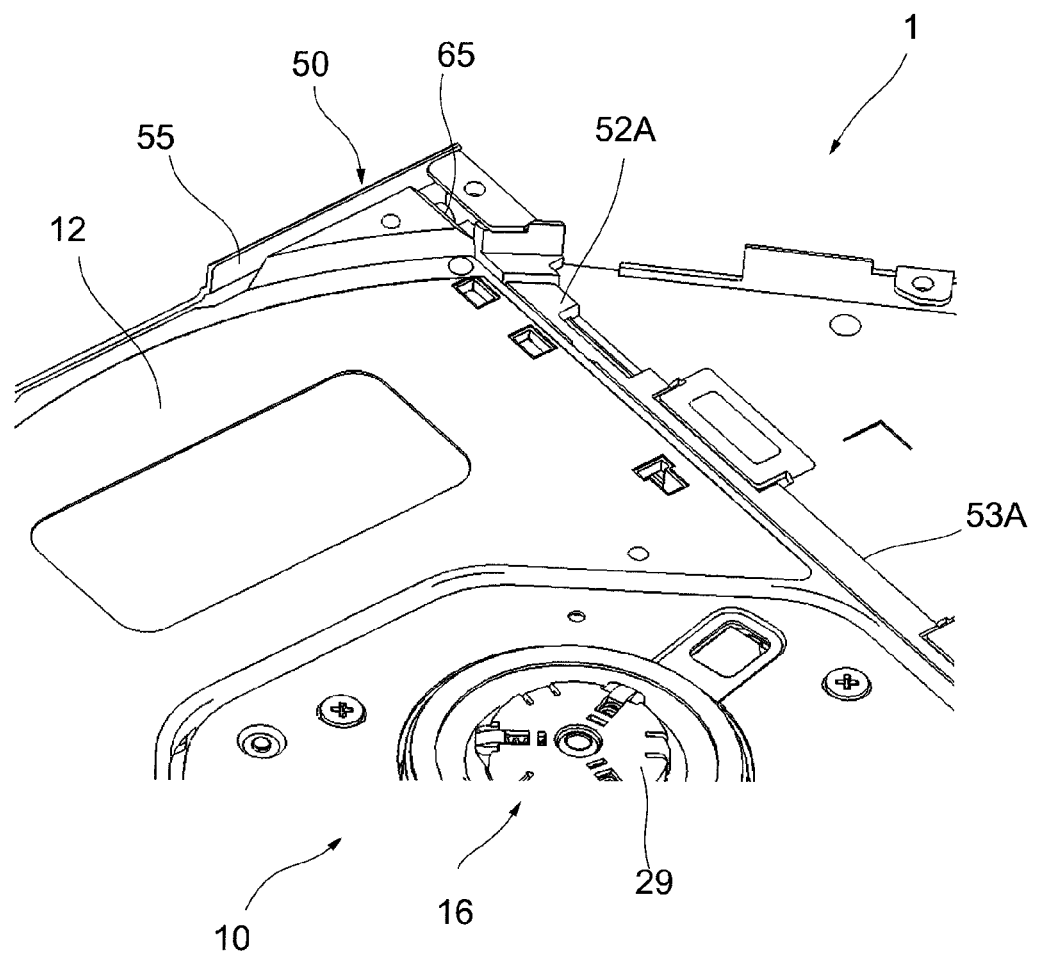
FIG. 6 is an oblique view of the optical disk apparatus shown in FIG. 4, where a part of the apparatus is shown in enlarged form.

FIG. 1 is an oblique view of an optical disk apparatus according to an embodiment of the present invention, which shows the state of the apparatus where an overall tray is ejected from a casing. FIG. 2 is an oblique view of optical disk apparatus shown in FIG. 1 when viewed from the rear thereof. FIG. 3 is an oblique view of an optical disk apparatus shown in FIG. 1 showing the state of the apparatus when an upper cover is detached. FIG. 4 is an oblique view of an optical disk apparatus showing the state of the apparatus when an upper cover is detached according to an embodiment of the present invention, where a tray is stored in a casing. FIG. 5 is a plan view of an optical disk apparatus shown in FIG. 4. FIG. 6 is an oblique view of an optical disk apparatus shown in FIG. 4, where a part of the apparatus is shown in enlarged form. In each of the above-mentioned Figures, for the purpose of easy understanding of the description, the thickness, size, enlargement and reduction and the like of respective members are described without meeting with the actual ones. In the present embodiment, the side of apparatus on which an optical disk is mounted is called "upper" and the opposite side thereof is called "lower" in the following description.

As shown in FIGS. 1-6, an optical disk apparatus 1 according to the present embodiment comprises a tray 10 mounting an optical disk and a casing 50 which stores the optical disk mounted tray 10 so that the tray may be inserted or ejected.

The tray 10 includes guide rails 11A and 11B for guiding insertion and ejection of tray 10 which are arranged on both sides parallel to the directions of tray insertion and ejection, respectively. The guide rails 11A and 11B are supported movably in directions of insertion and ejection of tray by rail guides 52A and 52B formed on the casing 50 mentioned later. The front end of tray 10 in the direction of tray ejection forms a bezel for choking an opening formed of the casing 50 in the direction of tray ejection. The bezel 19 is provided with an eject button 20 for ejecting tray 10 from the casing 50.

Tray 10 is arranged to be movable to guide rails 11A and 11B, respectively. When inserted into the casing 50 the tray 10 first goes into casing 50 with the guide rails 11A and 11B being left outside the casing 50, and the bezel 19 of tray 10 is abutted with the guide rails 11A and 11B, so that the guide rails 11A and 11B go into casing 50.

On an upper surface of tray 10, formed is an optical disk mounting section 12 on which an optical disk is mounted. A part of outer circumference of optical disk mounting section 12 has a substantially circular shape conforming to the shape of optical disk. The optical disk mounting section 12 is provided with an opening 13. A unit mechanism 15 mentioned later is fixed to the opening 13. Further, a lock mechanism for holding the storage state of tray 10 into casing 50 is arranged in the tray 10, but not shown.

The unit mechanism 15 comprises a spindle motor 16 for driving an optical disk mounted on optical disk mounting section 12 to rotate, an optical pickup 17 for recording information on a recording surface of optical disk and/or reproducing information recorded on the recording surface of optical disk and a pair of guide shafts (not shown) which support the optical pickup 17 so as to be movable in a radial direction of the mounted optical disk.

On the tip of a rotary shaft of the spindle motor 16 on the side of optical disk mounting section 12 a damper 29 is arranged which is inserted into the center hole of the optical disk arranged to restrain the movement of optical disk in the radial direction. The optical disk mounted on optical disk mounting section 12 is subjected to chucking by the damper 29 to be rotated and driven. On an end section away from the spindle motor 16 of optical pickup 17 one end of a flexible cable 27 is fixed in an electrically connected state. The other end of flexible cable 27 is electrically connected to a printed circuit board (not shown) arranged on the tray 10.

The casing 50 has a bottom case 55 and an upper cover 56. An end surface of casing 50 in the direction of tray ejection forms an opening for insertion and ejection of tray 10. On both sides 53A and 53B parallel to the insertion and ejection directions of tray of bottom case 55, rail guides 52A and 52B are formed to support guide rails 11A and 11B formed on tray 10 so as to be movable.

The rail guides 52A and 52B have shapes which are mutually line-symmetrical and are the same in basic structure though may be somewhat different in such as length in the tray insertion direction due to an overall structure (layout) of optical disk apparatus 1. Therefore, rail guide 52A is described here.

Figure 7:
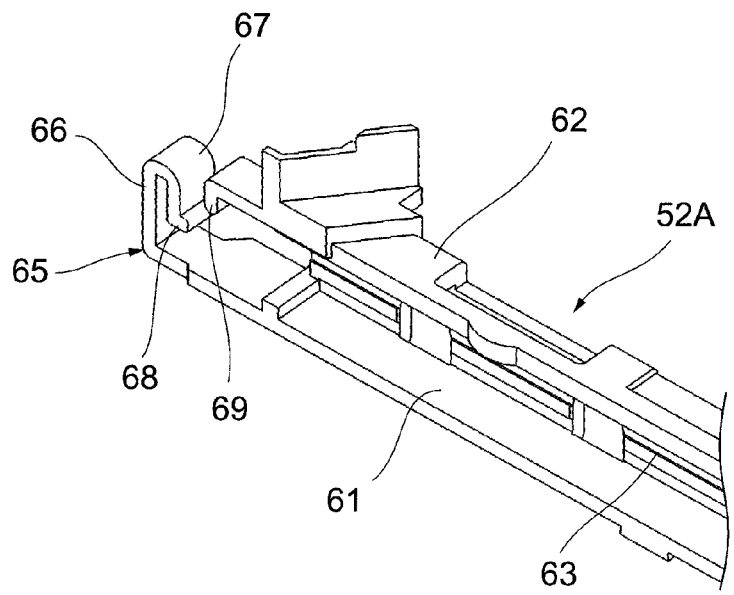
FIG. 7 is an oblique view of a part of a rail guide which is one of the constitutional elements of an optical disk apparatus according to an embodiment of the present invention, which is shown in enlarged form.
Figure 8:
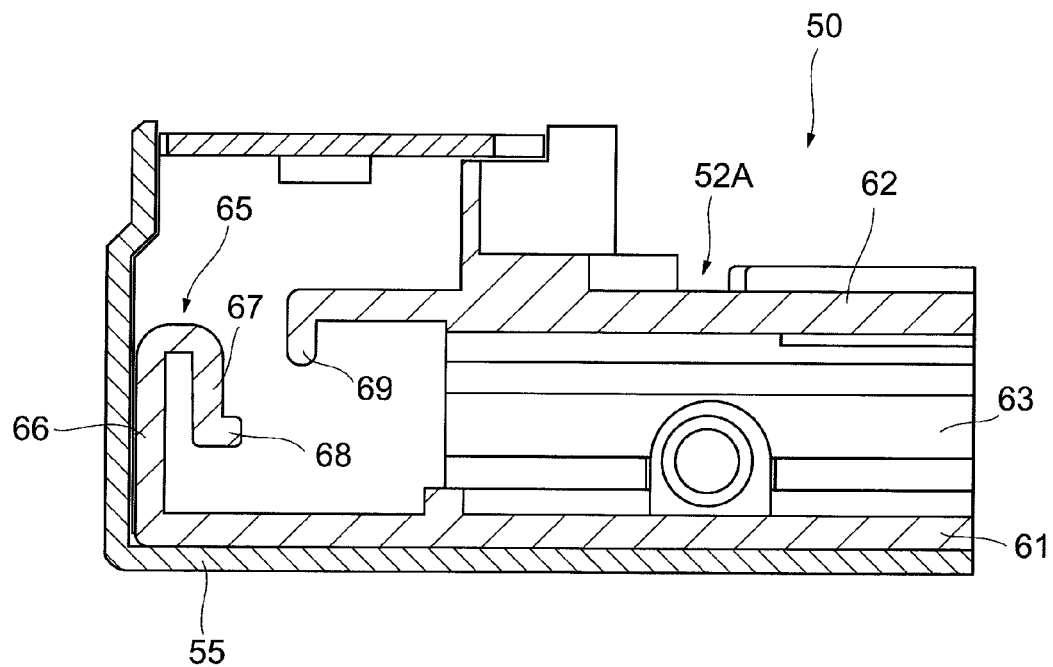
FIG. 8 is a sectional view of the apparatus shown in FIG. 3 taken along a line VIII-VIII.
Figure 9:
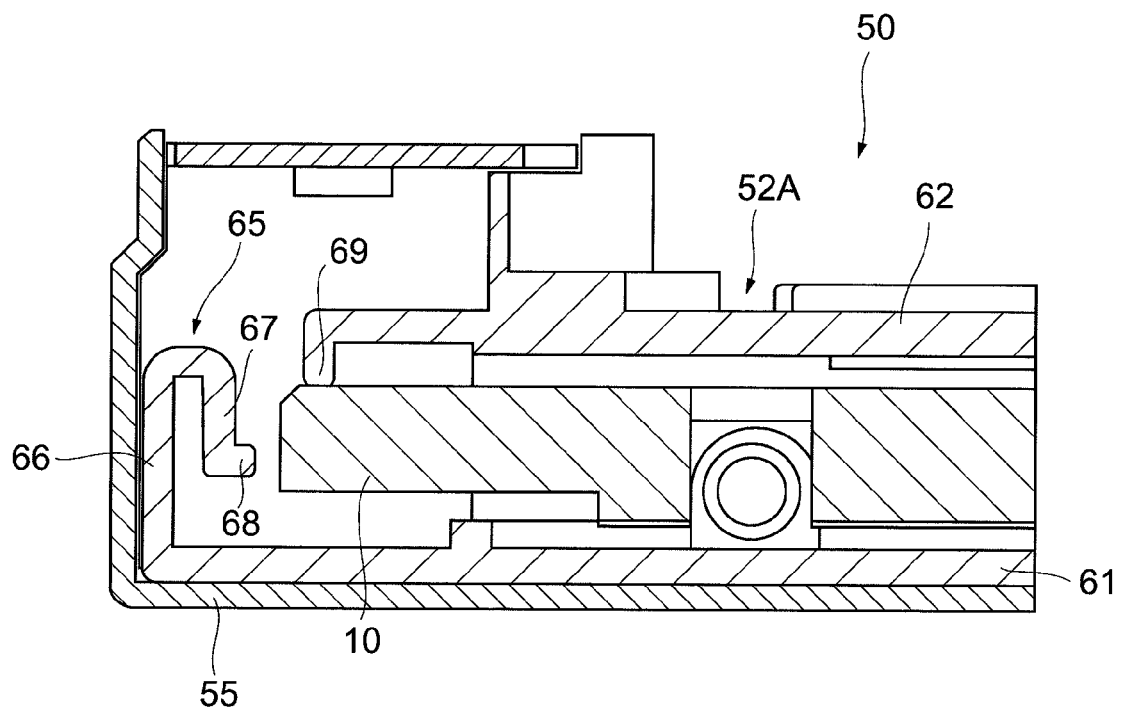
FIG. 9 is a sectional view of the apparatus shown in FIG. 4 taken along a line IX-IX, showing the state where the tray is at a normal position at which at least one of recording and reproduction of information is performed on an information recording surface of the optical disk.
Figure 10:
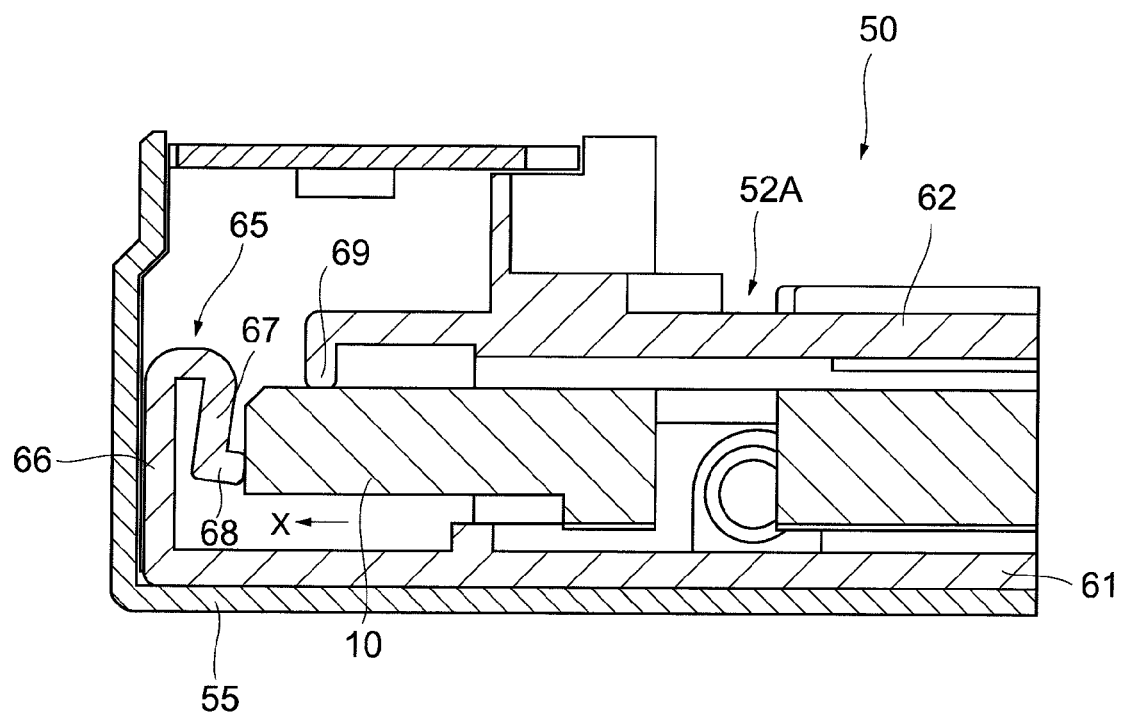
FIG. 10 is a sectional view of the apparatus shown in FIG. 4 taken along a line IX-IX, showing the state where the tray is moved toward a tray insertion direction from the normal position at which at least one of recording and reproduction of information is performed on an information recording surface of the optical disk.

FIG. 7 is an oblique view of a part of a rail guide which is one of the constitutional elements of an optical disk apparatus according to an embodiment of the present invention, which is shown in enlarged form. FIG. 8 is a sectional view of the apparatus shown in FIG. 3 taken along a line VIII-VIII. FIG. 9 is a sectional view of the apparatus shown in FIG. 4 taken along a line IX-IX, showing the state where the tray is at a normal position at which at least one of recording and reproduction of information is performed on an information recording surface of the optical disk. FIG. 10 is a sectional view of the apparatus shown in FIG. 4 taken along a line IX-IX, showing the state where the tray is moved toward an insertion direction from the normal position at which at least one of recording and reproduction of information is performed on an information recording surface of the optical disk.

As shown in FIGS. 7-9, the rail guide 52A is disposed in opposition with a bottom section 61 located on a bottom case 55 and comprises a ceiling section 62 located on the upper cover 56 and a side wall 63 arranged between the bottom section 61 and the ceiling section 62 and outside the casing 50. The rail guide 52A is made a guide surface toward the inner side of casing 50 open, which is of substantially a horseshoe shape in section. The guide rail 11A and the side section on which the guide rail 11A of tray 10 is arranged can be inserted into or ejected from a space defined by the bottom section 61, the ceiling section 62 and the side wall 63, in structure.

On the frontend of rail guide in the tray insertion direction a spring section 65 integrally formed with the bottom section 61 is arranged. The spring section 65 includes an standing section 66 continuously standing from the bottom section 61, an extending section 67 which is bent continuously and extends downwardly from an upper end of the upending section 66, and a convex section 68 which projects continuously in a direction of ejection of tray 10 from a lower end of the extending section 67. The convex section 68 is arranged in a position spaced by a predetermined interval from tray 10 when the tray 10 is in a normal position where at least one of recording and reproduction of information is performed on an information recording surface of optical disk (refer to FIG. 9). Further, the spring section 65 is configured to allow elastic deformation so that the convex section 68 can approach the upending section 66. With the elastic deformation, the vibration of tray 10 in the direction of tray insertion or ejection can be absorbed.

In the frontend of ceiling section 62 of rail guide 52A in the direction of tray insertion, a tray abutting section 69 projecting downwardly in a substantially vertical direction is formed. The tray abutting section 69 abuts against an upper surface of the frontend of tray 10 in the direction of tray insertion when tray 10 is stored into casing 50, to thereby suppress vertical vibrations of tray 10.

The casing 50 is provided with an ejecting mechanism for ejecting the tray 10, but not shown. Tray 10 and casing 50 are electrically connected by a flexible cable 40, and information for control processing and signal processing is sent and received to each other between tray 10 and casing 50.

In such configured optical disk apparatus 1, when inserting tray 10 mounting an optical disk toward the casing 50, the tray 10 stops at a normal position at which at least one of recording and reproduction of information is performed on an information recording surface of the optical disk, and a lock mechanism provided in tray 10 but not shown holds such storage state of tray 10 into casing 50 (refer to FIG. 9). In the normal position, the tray abutting section 69 abuts against the upper surface of the frontend of tray 10 in the direction of tray insertion. Some spacing is provided between the frontend of tray 10 in the direction of tray insertion and convex section 68 of spring section 65 to have no contact between them. In such a state, by performing a predetermined operation to optical disk apparatus 1, at least one of recording and reproduction of information is performed on an information recording surface of the optical disk.

On the other hand, when the tray 10 is ejected from the casing 50, the eject button 20 is depressed to release lock of tray 10 by the lock mechanism not shown, and start ejection of tray 10 by an ejecting mechanism not shown which is provided in casing 50. At this time, the tray 10 and spring section 65 are in no contact with each other, so that an activating force of the spring section 65 is not applied to tray 10, thus not affecting insertion and ejection of tray 10.

When the optical disk apparatus 1 under operation is subject to an external shock to cause tray 10 to move (shake) in the insertion direction as shown by 10 in FIG. 10 (in X-direction shown by arrow) or be subjected to pitching or rolling, the frontend of tray 10 in the insertion direction depresses the convex section 68 of spring section 65. With the depression a force toward the direction of tray insertion is applied to spring section 65, and elastic deformation in the direction of approaching the upending section 66 is caused, so that a force resulting from the elastic deformation absorbs the movement or vibrations of tray 10. Accordingly, the vibrations of tray 10 can be effectively suppressed. With recovery force of spring section 65, the tray 10 is returned to the normal position mentioned above. As a result, even though the optical disk apparatus 1 under operation is subject to a shock from the external, the optical disk apparatus 1 can perform recording and/or reproduction of information on an information recording surface of optical disk as usual, so providing a highly reliable optical disk apparatus 1.

In the embodiment, there is described the case where the spring section 65 and the rail guides 52A and 52B are integrally molded. However, the present invention is not limited to such a case. Alternatively, the spring section 65 may be formed by another member than the rail guides 52A and 52B and may be disposed at the frontend of rail guides 52A and 52B in the direction of tray insertion. In this case, any material other than the material forming the rail guides 52A and 52B can be appropriately selected, so providing an elastic force which is more optimal for absorbing any shock to tray 10.

In the description of the embodiment, when tray 10 is in the normal position where at least one of recording and reproduction of information on an information recording surface of optical disk is performed, the optical disk apparatus is configured to form a predetermined spacing between tray 10 and spring section 65. The present invention is not limited to such a case. When tray 10 is in the normal position as mentioned above, unless any activating force is applied to tray 10, the tray 10 and spring section 65 may be made in contact with each other.

Figure 11:
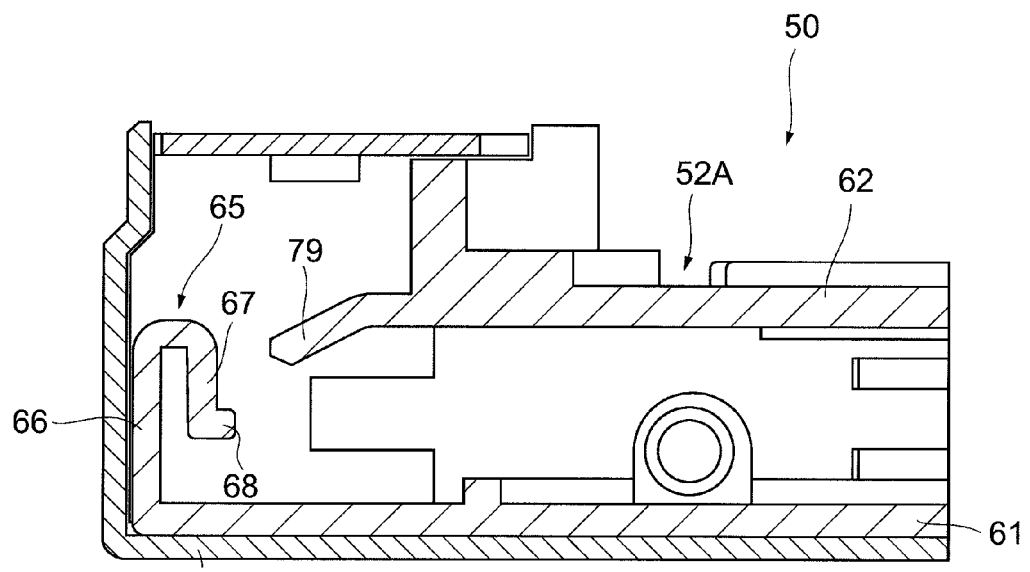
FIG. 11 is a sectional view of an optical disk apparatus according to another embodiment of the present invention, which corresponds to a sectional view taken along a line VIII-VIII, shown in FIG. 3.
Figure 12:
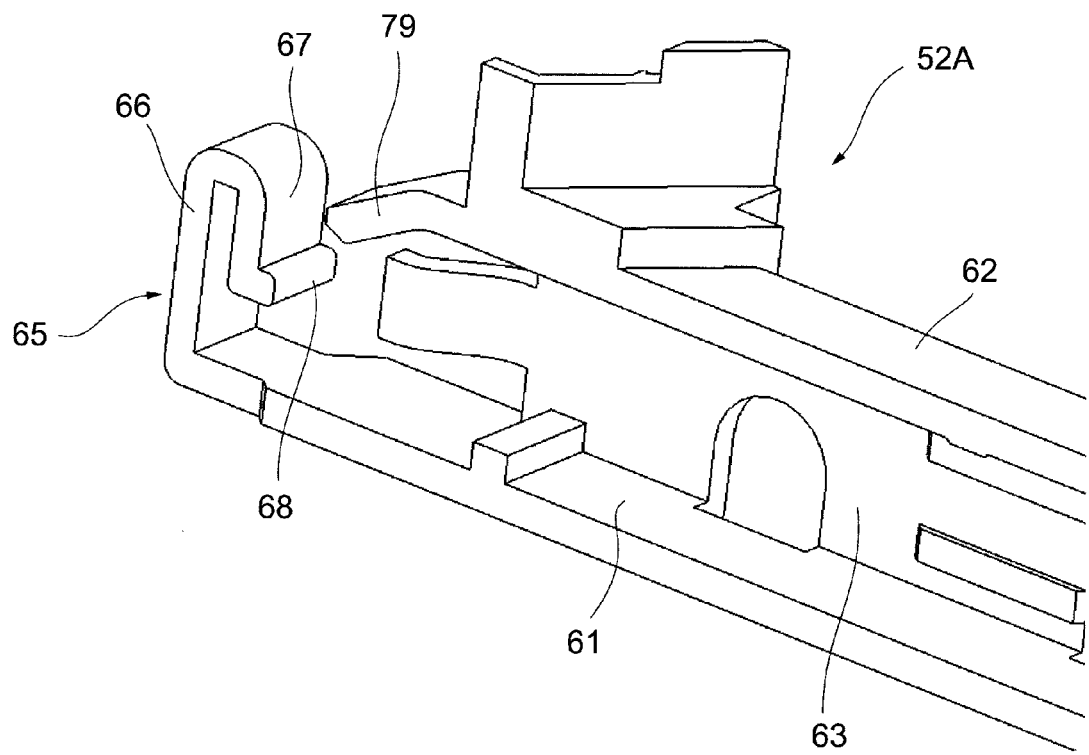
FIG. 12 is an oblique view of a part of the guide rail which is one of the constitutional elements of the optical disk apparatus shown in FIG. 11, which is shown in an enlarged form.

In the embodiment, the case of arranging tray abutting section 69 which substantially vertically projects downwardly from the frontend of ceiling section 62 in tray insertion direction is described. The present invention is not limited to such a case. In the frontend of ceiling section 62 in tray insertion direction, as shown in FIGS. 11 and 12, a tray abutting section 79 extending downwardly in an oblique direction with respect to the tray insertion direction may be arranged.

In the embodiment, the case of arranging spring section 65 to both rail guides 52A and 52B is described. The present invention is not limited to such a case. Alternatively, the spring section 65 may be arranged in either one of rail guides 52A and 52B.

If the spring section 65 can suppress vibrations of tray 10 by causing elastic deformation when a force directed to the tray insertion direction is applied, the shape of spring section 65 is not limited to any specified one. In addition, the spring section of rail guide 52A may be different in shape from the spring section of rail guide 52B according to a desired condition for such as an overall structure of optical disk apparatus 1.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. An optical disk apparatus for performing at least one of recording and reproduction of information on an information recording surface of an optical disk mounted on the apparatus, the optical disk apparatus comprising:

a tray configured to mount the optical disk thereon, wherein the tray includes a guide rail configured to guide movement of the tray in a tray insertion direction and a tray election direction, the guide rail disposed on sides of the tray parallel with the tray insertion direction and the tray election direction; and a casing configured to store the tray, so that the tray can be inserted and ejected, wherein the casing includes:

rail guides formed on sides facing to the guide rail of the tray when the tray is inserted, and configured to guide the guide rail, and a spring member formed on a front end of at least one of the rail guides, in the tray insertion direction, wherein the spring member is configured to provide elastic deformation, in the tray insertion direction, when a force in the tray insertion direction is applied to the spring member.

2. An optical disk apparatus according to claim 1, wherein when the tray moves in the tray insertion direction from a normal position of the tray at which at least one of recording and reproduction of information is performed on an information recording surface of the optical disk, the tray depresses the spring member to elastically deform the spring member.

3. An optical disk apparatus according to claim 1, wherein the spring member is integrally formed with the rail guides.

4. An optical disk apparatus according to claim 2, wherein the spring member is located with a predetermined spacing from a front end of the tray, when the tray is located at the normal position.

* * * * *